United States Patent [19]

Paulson

[11] 4,089,493
[45] May 16, 1978

[54] AIRCRAFT WITH COMBINATION POWER PLANT

[76] Inventor: Allen E. Paulson, 7701 Woodley Ave., Van Nuys, Calif. 91406

[21] Appl. No.: 727,950

[22] Filed: Sep. 29, 1976

[51] Int. Cl.² .............................................. B64D 37/00
[52] U.S. Cl. ........................... 244/135 R; 60/39.28 R; 137/567; 244/55; 244/135 C
[58] Field of Search ................. 244/135 R, 135 C, 55; 137/567; 123/136; 60/39.28 R, 224, 243

[56] References Cited

U.S. PATENT DOCUMENTS

| B 508,940 | 2/1976 | Risse et al. | 244/135 C X |
| 2,817,396 | 12/1957 | Booth | 137/567 X |
| 3,419,233 | 12/1968 | Wotton | 244/135 R |

FOREIGN PATENT DOCUMENTS

| 1,041,132 | 9/1966 | United Kingdom | 244/55 |

*Primary Examiner*—Barry L. Kelmachter
*Attorney, Agent, or Firm*—Harris, Kern, Wallen & Tinsley

[57] ABSTRACT

By employing in-line gas turbine power plants in the nose and tail of a low profile highly streamlined aircraft, twin engine reliability is obtained with only a single engine frontal area combined with the employment of strakes rather than pipes for the nose engine exhaust, excellent fuel economy is obtained. While a nose mounted turboprop serves as the main power supply, a tail mounted turbojet with only a small fraction of the turboprop horsepower provides a supplementary power source during take-off or optionally to enhance cruise performance. Should the turboprop fail in flight the turbojet is capable of taking over at a reduced cruising speed. A fuel system common to both engines offers additional safety features and an improved method for effecting proper trim with either or both engines operative.

6 Claims, 2 Drawing Figures

AIRCRAFT WITH COMBINATION POWER PLANT

BACKGROUND OF THE INVENTION

This invention relates to an aircraft of exceptional performance in view of its weight and fuel economy. The employment of a nose mounted high horsepower turboprop in a highly streamlined aircraft of low frontal area in line with a light weight low powered turbojet in the tail insures twin engine reliability with substantially less fuel comsumption than is possible with a twin engine craft of comparable weight.

SUMMARY OF THE INVENTION

Specifically, the invention resides in the effective employment within a short take-off and landing aircraft of both turboprop and turbojet power in a manner to gain the economy and performance of a single engine type. The features herein taught are particularly adapted for use in a small size (6 to 10 place for example) pressurized business/utility aircraft. A very high safety factor is achieved through the provision of a common fuel supply connecting nose and tail mounted gas turbines in a manner automatically to activate the tail trubine on failure of the main nose turbine to permit the pilot instantly to activate the tail turbine when otherwise desired. The common fuel supply includes the additional safety feature of a standby pump under pilot control should the main pressure pump fail, plus means for the selective transfer of fuel between port and starboard tanks to effect proper trim.

DESCRIPTION OF THE PREFERRED EMBODIMENT

Figure 1:
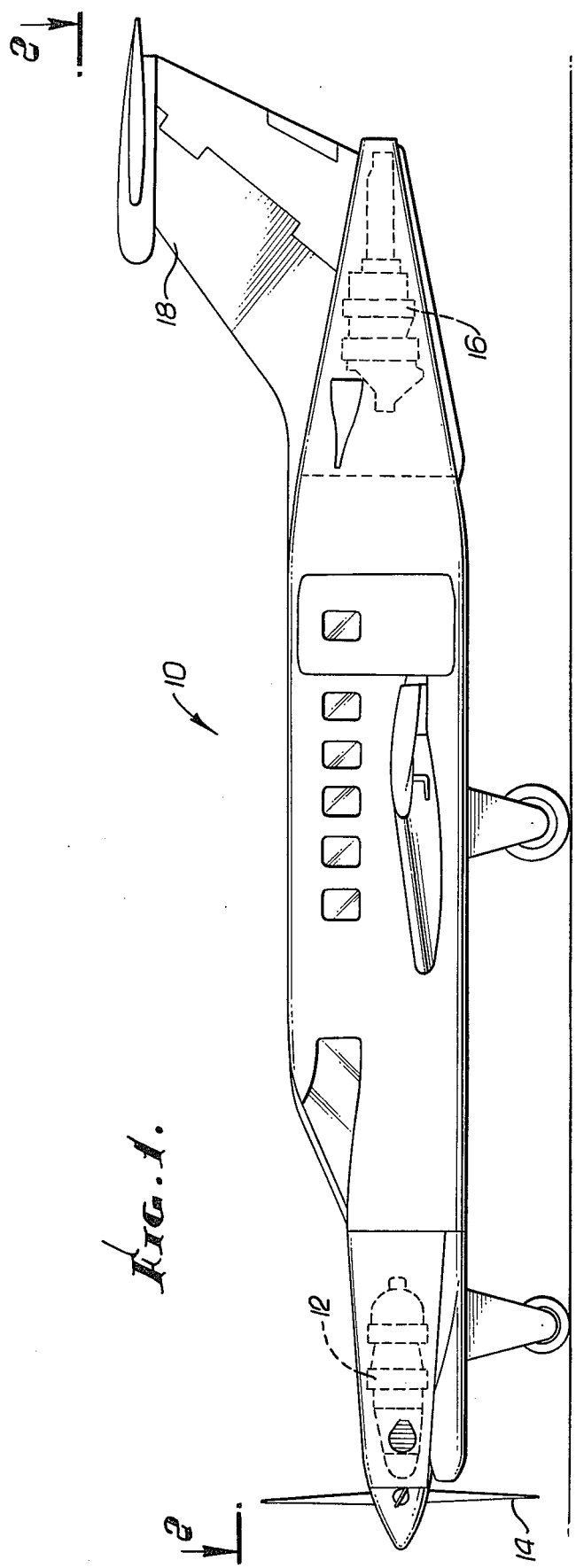
FIG. 1 is a side elevational view of an aircraft employing the invention.
Figure 2:
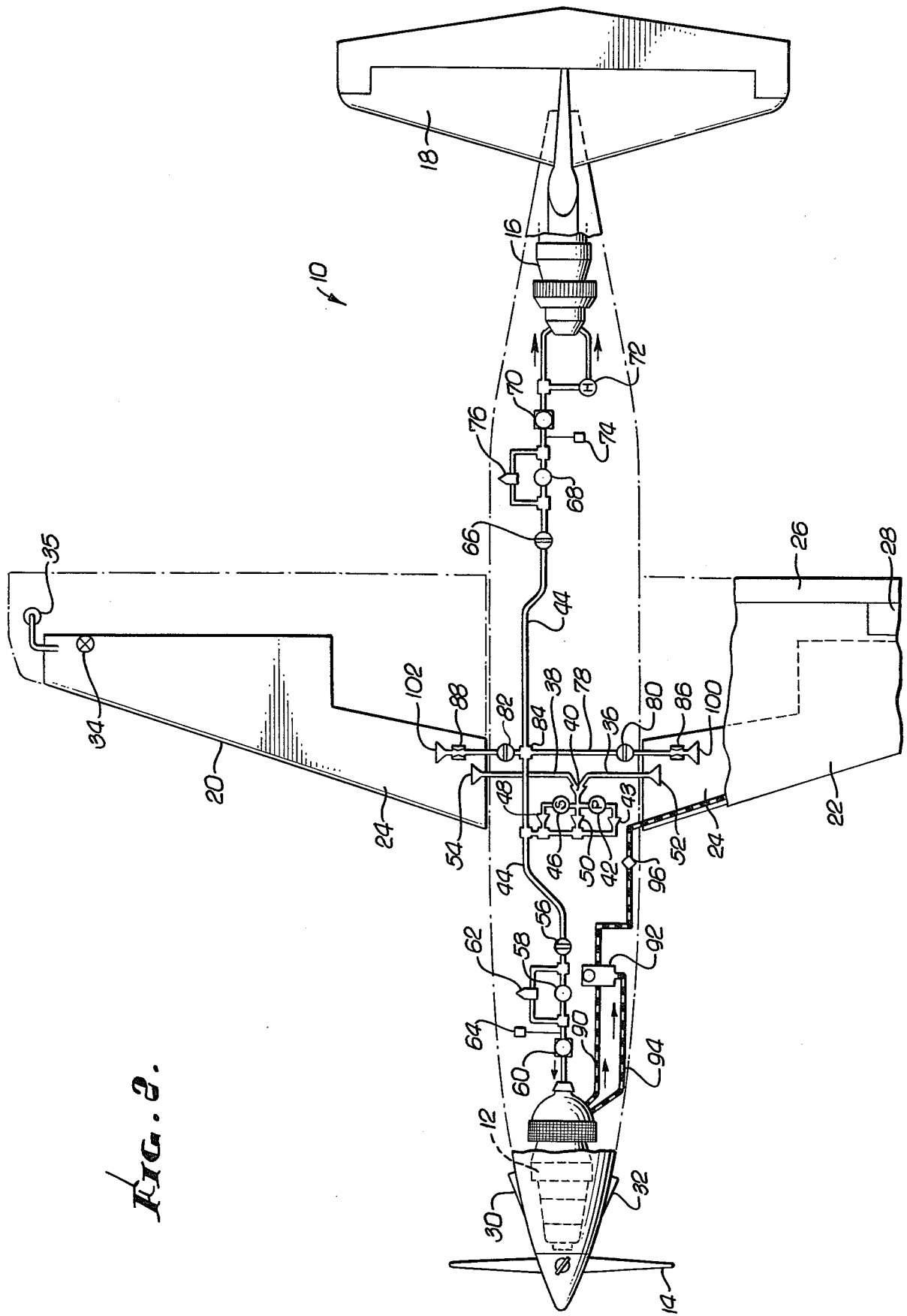
FIG. 2 is a plan view of the aircraft shown in FIG. 1, partially broken away to disclose the common fuel system.

As shown in FIG. 1, a low profile streamlined aircraft generically designated 10 has a nose mounted turboprop engine 12 driving propeller 14 and a tail mounted turbojet engine 16. As best shown in FIG. 2 the elongated nose is highly streamlined as is the entire fuselage which terminates in a tapered tail section which houses turbojet 16 and provides support for a "High T" tail assembly 18 with trimmable stabilizer. Wing sections 20 and 22, of comparatively thin construction for the size and weight of the aircraft, each house an identical wing tank which extends along the leading edge of each section, as shown at 24 of the partially broken away wing 22, FIG. 2.

The forward engine 12 in the preferred embodiment as shown in FIGS. 1 and 2 may be a turboprop derated from 1089 to about 850 established horsepower. Aft engine 16 may a small turbojet rated as low as 660 pounds thrust and a dry weight of only 98 pounds. Wings sections 20 and 22 provide aircraft 10 with a short span supercritical mono-wing fitted with full span trailing edge flaps 26 with lateral control provided by double spoiler panels on the outboard section of each wing as partially shown at 28, FIG. 2. The elongated nose is provided, in the area of Engine 12, with strakes 30 and 32, FIG. 2. Drooped wing tips enhance low speed performance. With a maximum gross take-off weight of 6500 pounds the craft has short take-off and landing performance with only the forward engine. The takeoff ground run is about 670 feet with liftoff occurring at 70 miles per hour, and requires 1270 feet to clear a 50-foot obstacle. The accelerate-stop distance is 1200 feet for an aborted takeoff. The total FAA landing distance (over a 50 foot obstacle) is only 1000 feet with prop reverse. The craft climbs up to 3000 feet per minute and "max cruises" at 380 M.P.H. at 20,000 feet. When flying at "Econ Cruise" it averages 11 miles per gallon with a range of over 2800 miles plus a 30 minute fuel reserve. While aft engine 16 is automatically cut in on takeoff only if engine 12 suffers a power failure, it may also be used to increase takeoff performance. A torque sensor (not shown) may be used to start aft engine 16 in response to a power failure in engine 12. During takeoff aft engine 16 is preferably maintained in idle, hence may instantly be activated if needed. As shown in FIG. 2, each tank is provided with the usual filler caps 34 and is vented as shown at 35.

A pair of equal length feed lines 36 and 38 lead, respectively, from port and starboard wing tanks 24, through a common equalizing valve 40 and into a branched fluid line in which a pressure pump 42 is series connected through check valve 43 to a pressure manifold 44. Manifold 44 leads, through valves, filters, and meters, as below described, to the fore and aft turbines 12 and 16. A standby booster pump 46, normally inactive but which may be activated by the pilot is also connected in fluid flow relation, through check valve 48, to manifold 44. A check valve 50 is disposed between the low and high pressure sides of pumps 42 and 46 permitting fuel flow from tank to engine bypassing the pumps 42, 46. Screen covered cone inlets 52, 54 are disposed at the inlet ends of main feed lines 36 and 38.

Assuming main pump 42 operating and shut-off valve 56 open, pressurized fuel is fed to engine 12 through filter 58 and flow meter 60. Bypass valve 62, normally closed, provides a safety factor in the event that filter 58 clogs. Pressure transmitter 64 permits the pilot to read the pressure of fuel flow through flow meter 60 to engine 12. In a somewhat similar manner fuel is fed to aft engine 16 through open shut-off valve 66, filter 68 and flow meter 70 and through a pair of branched lines to engine 16. As illustrated by arrows, a heater 72 is series connected in one of the branched fuel lines to feed a vaporized starting mixture to turbojet 16, after which heater 72 may be switched off. Pressure transmitter 74 provides pilot indication of aft engine fuel pressure, and bypass valve 76 is the counterpart of valve 62 above described.

A port and starboard fuel tank balancing system includes a cross feed fuel line 78 connecting both fuel tanks and controlled by solenoid valves 80 and 82 and cross connected to pressure manifold 44 at 84. Flow restricters 86 and 88 serve to insure an acceptable pressure and flow rate of pressurized fuel from manifold 44 into either wing tank responsive to pilot actuation of either valve 80 or valve 82 for the purpose of effecting fuel tank trim. Thus a fuel supply system of extreme simplicity and employing a single pressure pump 42 (or in case of failure, standby pump 46 supplies fuel to both engines which is drawn uniformly from each wing tank 24. Manifold 44 provides a pressurized fuel source for the selective feeding of fuel into either wing tank by pilot actuations of shut-off valves 80 and 82 and at an acceptable flow rate through outlets 100, 102 as controlled by restricters 86 and 88.

A forward engine fuel drain system includes a fluid line 90 leading from engine 12 into a collector tank 92, providing a bleed off which drains in the turbine section at shut down. A second drain line 94 also leads into the tank 92 providing the return from the engine fuel control which has a bleed off during starting. Line 90 continues from collector tank 92 to the wing fuel tank, with flow controlled by a solenoid valve 96.

Other adaptations and modifications of the principles taught herein will be readily apparent to persons skilled in the art without departure from the invention concepts as defined in the appended claims.

I claim:

1. An aircraft having in combination:
   a low profile highly streamlined fuselage having a wing comprising two sections respectively having fuel tanks disposed therein;
   a nose mounted turboprop engine;
   a tail mounted turbojet engine of relatively low horsepower in respect to said turboprop engine;
   a fuel feed system common to both engines and including both a pressure pump and a stand-by pump;
   a pair of main fuel feed lines leading respectively from said fuel tanks to the inlet sides of said pumps;
   a pressure manifold directly connected between said engines;
   fuel lines connecting the outlet sides of said pumps to said manifold;
   said fuel system common to both engines including fluid flow equalizing means disposed between the opposite ends of said main fuel feed lines and said pressure and stand-by pumps; and
   check valve means series connected between the outlet sides of said pumps and said manifold.

2. The aircraft of claim 1, including:
   a cross feed fuel line extending laterally of said manifold and into said tanks; and
   two shut-off valve means respectively disposed between said manifold and said tanks for selectively controlling fuel flow from said manifold into said tanks.

3. The aircraft of claim 2 wherein end portions of said cross feed fuel line are disposed within the tanks and are provided with means for restricting pressurized fluid flow from said manifold into said tanks.

4. The aircraft of claim 1 including:
   means for draining fuel from said turboprop engine comprising a collector tank;
   a pair of fluid lines leading from said turboprop engine to said collector tank;
   a fluid line leading from said collector tank to one of said fuel tanks; and
   valve means intermediate said collector tank and said one fuel tank.

5. An aircraft having in combination:
   a low profile highly streamlined fuselage having a wing comprising two sections respectively having fuel tanks disposed therein;
   a nose mounted turboprop engine;
   a tail mounted tubojet engine of relatively low horsepower in respect to said turboprop engine;
   a fuel feed system common to both engines and including both a pressure pump and a stand-by pump;
   a pair of main fuel feed lines leading respectively from said fuel tanks to the inlet sides of said pumps;
   a pressure manifold directly connected between said engines;
   fuel lines connecting the outlet sides of said pumps to said manifold; and
   said pressure manifold leading from the outlet sides of said pumps to said engines through, respectively, shut-off valve means, filter means, and a flow meter.

6. The aircraft of claim 5 including fuel vaporizing means and a branch fuel line leading from said manifold to said vaporizing means and therefrom to said turbojet engine.

* * * * *